US011138750B2

(12) United States Patent
Lee et al.

(10) Patent No.: US 11,138,750 B2
(45) Date of Patent: Oct. 5, 2021

(54) DISTANCE ESTIMATING METHOD AND APPARATUS

(71) Applicant: SAMSUNG ELECTRONICS CO., LTD., Suwon-si (KR)

(72) Inventors: Jae-woo Lee, Hwaseong-si (KR); Ja-hoo Koo, Seoul (KR); Won-ju Lee, Suwon-si (KR); Yoon-suk Hyun, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/591,016

(22) Filed: Oct. 2, 2019

(65) Prior Publication Data
US 2020/0118283 A1 Apr. 16, 2020

(30) Foreign Application Priority Data

Oct. 10, 2018 (KR) .................. 10-2018-0120158

(51) Int. Cl.
*G06T 7/536* (2017.01)
*G06T 7/70* (2017.01)
*G06T 7/20* (2017.01)
*G06T 7/60* (2017.01)

(52) U.S. Cl.
CPC .............. *G06T 7/536* (2017.01); *G06T 7/20* (2013.01); *G06T 7/60* (2013.01); *G06T 7/70* (2017.01); *G06T 2207/30256* (2013.01)

(58) Field of Classification Search
None
See application file for complete search history.

(56) References Cited

U.S. PATENT DOCUMENTS

| 8,269,848 | B2 | 9/2012 | Kakinami | |
|---|---|---|---|---|
| 2004/0054473 | A1 | 3/2004 | Shimomura | |
| 2013/0261838 | A1* | 10/2013 | Schut | G06K 9/00798 701/1 |
| 2015/0165973 | A1* | 6/2015 | Takemae | B60R 1/00 348/148 |
| 2015/0302611 | A1* | 10/2015 | Fan | G06K 9/52 382/104 |
| 2017/0091565 | A1 | 3/2017 | Yokoi et al. | |
| 2017/0240149 | A1* | 8/2017 | Han | G08G 1/166 |

(Continued)

FOREIGN PATENT DOCUMENTS

| JP | 2002296350 A | * | 10/2002 |
|---|---|---|---|
| JP | 4681856 B2 | | 5/2011 |
| KR | 10-1646495 B1 | | 8/2016 |

(Continued)

OTHER PUBLICATIONS

Communication dated Feb. 11, 2020, from the European Patent Office in counterpart European Application No. 19201702.8.

*Primary Examiner* — Dakshesh D Parikh
(74) *Attorney, Agent, or Firm* — Sughrue Mion, PLLC (57) ABSTRACT

A distance estimating method and apparatus are provided. The method includes acquiring a real target length corresponding to target points of an object, calculating, from an input image, an image target length corresponding to the real target length, and estimating a distance from a distance estimating apparatus to the object, based on the real target length, the image target length, and a focal length thereof.

14 Claims, 7 Drawing Sheets

(56) References Cited

U.S. PATENT DOCUMENTS

2018/0165822 A1* 6/2018 Uliyar ................ G06K 9/00798
2019/0333381 A1* 10/2019 Shalev-Shwartz ...........................
  B60W 50/0097

FOREIGN PATENT DOCUMENTS

KR  10-2018-0022277 A  3/2018
KR  10-2018-0048094 A  5/2018

* cited by examiner

DISTANCE ESTIMATING METHOD AND APPARATUS

CROSS-REFERENCE TO RELATED APPLICATION

This application claims priority from Korean Patent Application No. 10-2018-0120158, filed on Oct. 10, 2018, in the Korean Intellectual Property Office, the disclosure of which is incorporated by reference herein in its entirety.

BACKGROUND

1. Field

Methods and apparatuses consistent with the present disclosure relate to distance estimating technology.

2. Description of the Related Art

Active Cruise Control (ACC) technology is required in autonomous driving (e.g., Advanced Driver Assistance System (ADAS)). The ACC technology is a technology for sensing the speed of a preceding vehicle in a lane where a vehicle is currently driving and adjusting the speed of the vehicle such that the vehicle may not collide with the preceding vehicle by driving while maintaining a certain distance from the preceding vehicle.

Some of the vehicles currently on the market include a function of, when a desired target speed is input thereto, driving at the target speed when there is no preceding vehicle and maintaining a certain distance from a preceding vehicle by reducing the speed thereof accordingly when the preceding vehicle appears. In order to implement such technology, a technology for stably measuring a distance to another vehicle is required.

SUMMARY

It is an aspect to provide a distance estimating method and apparatus.

According to an aspect of an embodiment, there is provided a distance estimating method including acquiring a real target length corresponding to target points of an object; calculating, from an input image, an image target length corresponding to the real target length; and estimating a distance from a distance estimating apparatus to the object, based on the real target length, the image target length, and a focal length thereof.

According to another aspect of an embodiment, there is provided a distance estimating apparatus including an image sensor configured to acquire an input image; and a processor configured to acquire a real target length corresponding to target points of an object; calculate, from the input image, an image target length corresponding to the real target length; and estimate a distance from the distance estimating apparatus to the object, based on the real target length, the image target length, and a focal length thereof.

According to another aspect of an embodiment, there is provided a an image sensor comprising a lens and an image plane, the image sensor configured to capture an input image of a target object; and a processor configured to generate a projected image from the input image; estimate a real lane width based on a lane distance between lane lines in the projected image; calculate, from the input image, an image lane width and an image target object width in pixels; calculate a first ratio between the image lane width and the image target object width; calculate a real target object width based on the real lane width and the first ratio; and estimate a distance from the image sensor to the target object, based on the real target object width, the image target object width, and a focal length from a focal point of the lens to the image plane.

BRIEF DESCRIPTION OF THE DRAWINGS

Embodiments will be more clearly understood from the following detailed description taken in conjunction with the accompanying drawings in which.

DETAILED DESCRIPTION

Figure 1:
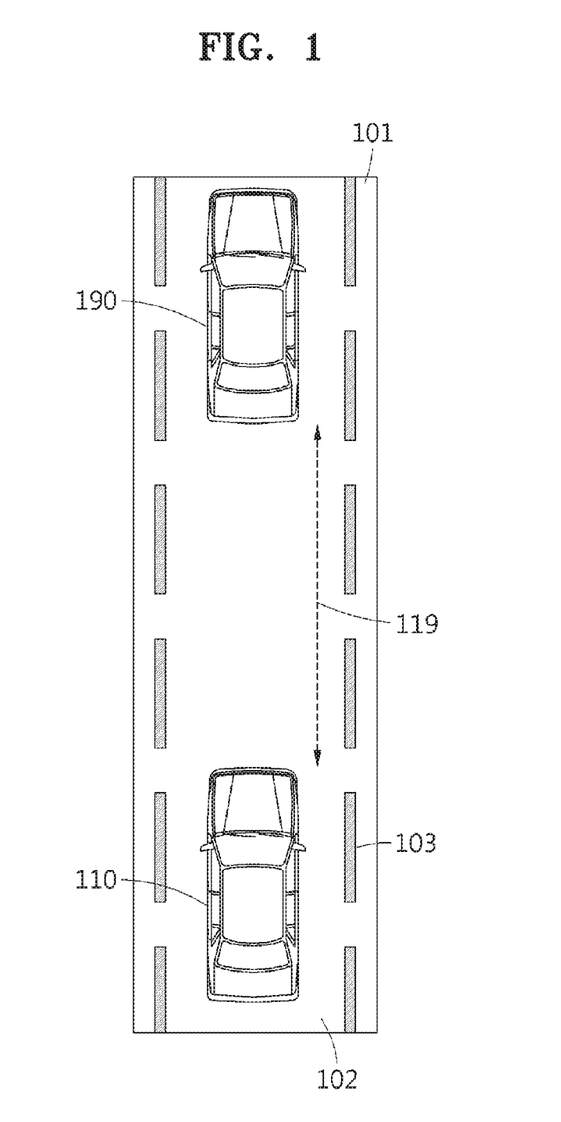
FIG. 1 is a diagram illustrating a preceding object and a distance estimating apparatus according to an embodiment.

FIG. 1 is a diagram illustrating a preceding object and a distance estimating apparatus according to an embodiment.

A distance estimating apparatus 110 according to an embodiment may estimate a distance 119 to a preceding object 190. The distance 119 to the preceding object 190 may represent a straight distance 119 from the distance estimating apparatus 110 to the preceding object 190. The distance estimating apparatus 110 may acquire an input image through an image sensor and estimate the distance 119 to the preceding object 190 based on the input image.

Distance estimation using a vanishing point may present an error when the vanishing point changes due to camera motion (e.g., pitch motion). Such a vanishing point change may occur when a vehicle crosses a speed bump, passes a rugged road, or passes an inclined road. Regardless of a vanishing point change, the distance estimating apparatus 110 according to an embodiment may robustly estimate a distance despite a ground bend by using a geometric relationship between an object width and a lane width.

For example, the geometric relationship between the object width and the lane width appearing in the input image may be the same as or similar to the relationship between the object width and the lane width in the real world. Thus, the distance estimating apparatus 110 may estimate the vehicle width in the real world based on the relationship between the object width and the lane width appearing in the input image. The distance estimating apparatus 110 may estimate the distance 119 to the preceding object 190 based on the vehicle width in the real world. Hereinafter, with reference to FIGS. 2 to 8, a description will be given of a technique for stably estimating the distance 119 to the preceding object 190 by only a single input image.

For reference, herein, a road 101 may include one or more lanes 102. A lane line 103 may represent a boundary line between a lane 102 and another lane 102. However, the inventive concept is not limited to the case where the lane line 103 is necessarily in the road 101 or the lane 102. A driving lane 102 may represent a lane 102 where a vehicle is currently driving. As a kind of lane line 103, a center line may represent a boundary line indicating no entry of vehicles.

Figure 2:
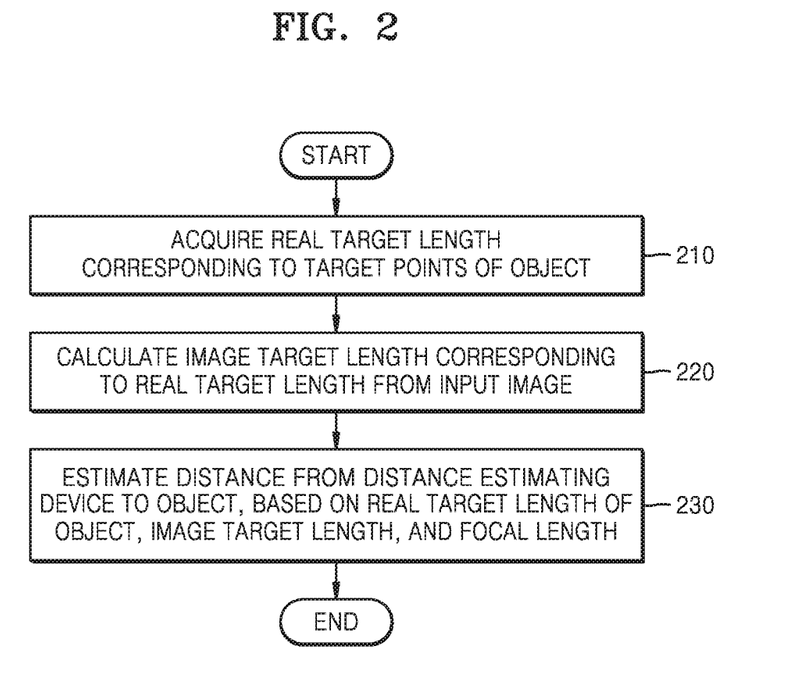
FIG. 2 is a flowchart illustrating a distance estimating method according to an embodiment.

FIG. 2 is a flowchart illustrating a distance estimating method according to an embodiment.

First, in operation 210, a distance estimating apparatus may acquire a real target length corresponding to target points of an object. The target points may be certain points designated in the object and may represent two points designated as a reference for distance estimation. For example, the real target length may be a length corresponding to the physical width of the object, and the target points may be two points designated to set the width of the object and may be the leftmost point of the object along a lateral axis with respect to a longitudinal axis and the rightmost point thereof parallel thereto. In the case of a three-dimensional (3D) bounding box having a real dimension covering the object in the physical world, each vertex of the front face or the rear face of the bounding box may correspond to the target point. However, the inventive concept is not limited thereto, and as the distance between feature points in the visual appearance of the object, for example, in the case where the object is a vehicle, points (e.g., center points) corresponding to two rear lamps may be set as the target points, or points (e.g., center points) corresponding to two front lamps may be set as the target points.

In addition or alternatively, the target points may be set for the height instead of the width. For example, when the object is a vehicle, a point corresponding to the bottom of the vehicle and a point corresponding to the top of the vehicle may be set as the target points. In this case, the real target length may represent the height (e.g., vehicle height) of the vehicle.

Acquisition of the real target length will be described below with reference to FIGS. 5 and 6.

In operation 220, the distance estimating apparatus may calculate an image target length corresponding to the real target length from the input image. The image target length may represent a length corresponding to the target points in the input image. The distance estimating apparatus may detect the bounding box including the object from the input image and determine the image target length based on the detected bounding box. For example, the image target length may represent the length between the vertices of the bounding box including the object. When the bounding box is a two-dimensional (2D) bounding box, the image target length may be the length of a base line of the bounding box. When the bounding box is a 3D bounding box, the image target length may be the length of a base line of the rear face constituting the bounding box. For example, with respect to a center axis of the road, the rear face of the bounding box may represent a surface facing the distance estimating apparatus. In other words, among a plurality of faces of the bounding box, the face located closer to the distance estimating apparatus with respect to the center axis of the road may be referred to as the rear face, and the face located farther from the distance estimating apparatus may be referred to as the front face. The center axis of the road may be an axis defined along the center points of the lane where the distance estimating apparatus is located and may appear as a straight line in a straight road and as a curved line in a curved road.

The input image may be, for example, a color image. The color image may include a plurality of color channel images. The color channel images may include, for example, a red channel image, a green channel image, and a blue channel image. The pixel of each color channel image may represent the intensity of light corresponding to the wavelength of the color in the light received through a sensor. However, the input image is not limited thereto.

Subsequently, in operation 230, the distance estimating apparatus may estimate the distance from the distance estimating apparatus to the object, based on the real target length of the object, the image target length, and a focal length thereof. For example, the distance estimating apparatus may estimate the distance to the object from the focal length based on the relationship between the real target length and the image target length. This is because the proportional relationship between the real target length and the image target length is the same as the proportional relation between the distance to the object and the focal length. This distance estimation will be described below with reference to FIG. 7.

Figure 3:
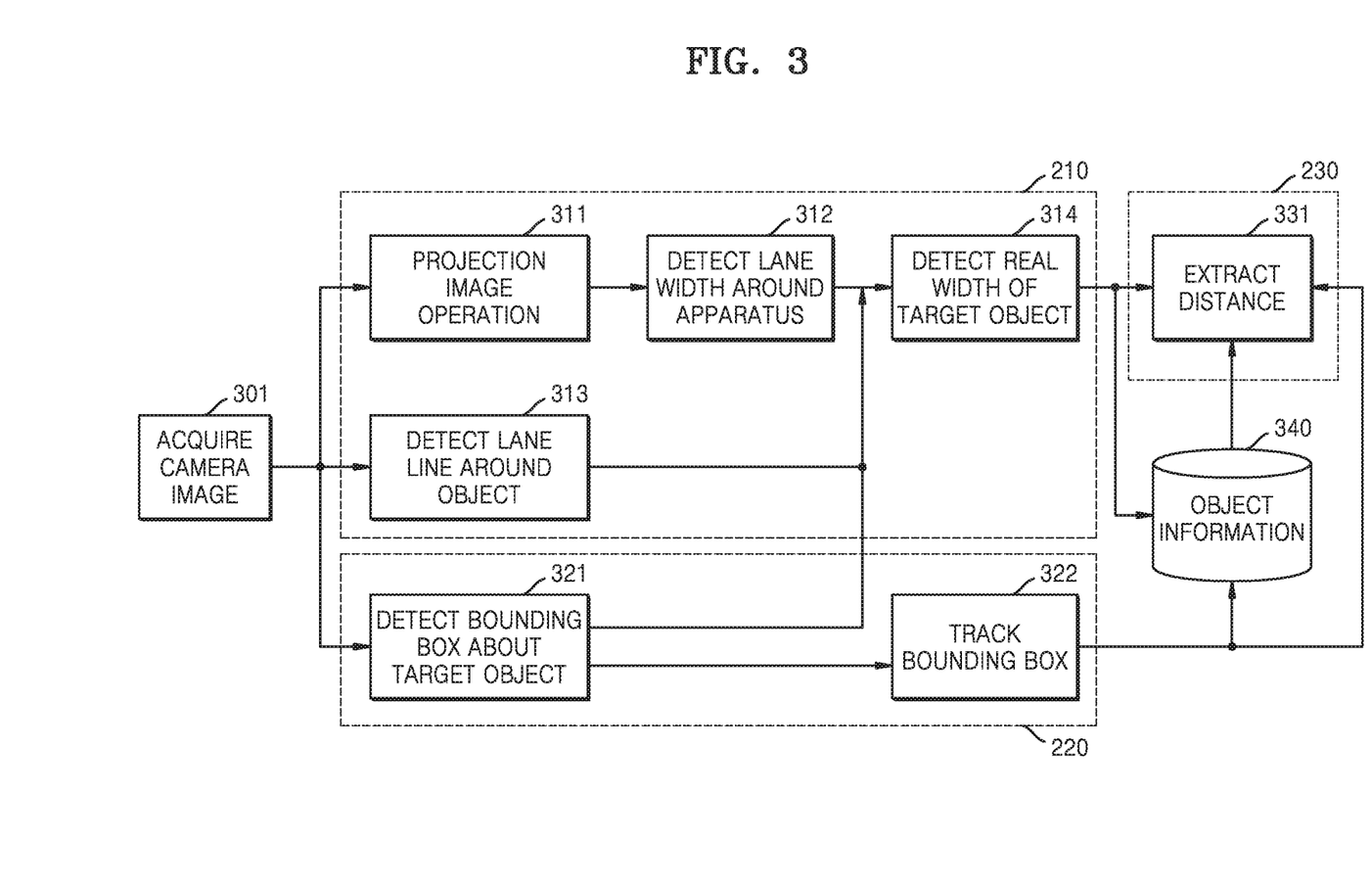
FIG. 3 is a diagram illustrating in detail a distance estimating process according to an embodiment.

FIG. 3 is a diagram illustrating in detail a distance estimating process according to an embodiment.

In operation 301, the distance estimating apparatus may acquire a camera image. For example, the distance estimating apparatus may receive the camera image through one or more image sensors. The image sensors may be installed to capture an image on a frontward side of the distance estimating apparatus. The image sensor may photograph a scene corresponding to a viewing angle on the frontward side. However, the number of image sensors and the installation positions thereof are not limited thereto.

In operation 311, the distance estimating apparatus may perform a projection image operation. For example, the distance estimating apparatus may generate a projection image by projecting the input image on a ground surface. The distance estimating apparatus may generate the projection image through homography. The projection image may correspond to, for example, a bird's eye view.

In operation 312, the distance estimating apparatus may detect the lane width around the distance estimating apparatus. The distance estimating apparatus according to an embodiment may estimate a lane line for the lane where the object is located in the input image. The distance estimating apparatus may determine the image lane width based on the estimated lane line. Herein, the image lane width may be a length corresponding to the width of the lane detected from the input image and may be, for example, a pixel distance between a lane line and another lane line that define the lane identified in the input image. Determination of the image lane width will be described below with reference to FIG. 5.

For example, the distance estimating apparatus may detect the lane line by interpolating portions corresponding to the same line in the input image. For example, the lane line may be a dotted line in which portions corresponding to a line are arranged at certain intervals. Even when the lane line is a dotted line, the distance estimating apparatus may detect the lane line by converting the dotted line into a solid line through the above interpolation.

In operation 313, the distance estimating apparatus may detect the lane line around the object. For example, the distance estimating apparatus may estimate a real lane width based on the projection image obtained by projecting the input image on the ground surface. The real lane width may be estimated, for example, in units of meters. The distance estimating apparatus may identify lane lines in the projection image and estimate a horizontal interval between the lane lines. The horizontal interval between the lane lines may correspond to the real lane width. The lane line identification using the projection image and the estimation of the real lane width will be described below with reference to FIG. 4.

However, acquisition of the real lane width is not limited thereto. In response to a case where high-definition (HD) map data may be accessed, the distance estimating apparatus may acquire the real lane width of the lane where the object is located from the map data corresponding to the current road. For example, the distance estimating apparatus may acquire lane information corresponding to geographical coordinates where the object is located from the HD map data and extract the real lane width from the lane information.

In operation 314, the distance estimating apparatus may detect the real width of a target object. For example, the distance estimating apparatus may calculate the real target length based on the image target length and the lane line appearing in the input image. The distance estimating apparatus may calculate a ratio between the image target length and the image lane width corresponding to the lane where the object is located from the input image. The distance estimating apparatus may estimate the real target length from the real lane width based on the ratio. Estimation of the real target length will be described below with reference to FIG. 5.

In operation 321, the distance estimating apparatus may detect a bounding box for the target object. For example, the distance estimating apparatus may detect the bounding box covering the object from the input image. The distance estimating apparatus may detect the bounding box by using one of various algorithms. For example, the distance estimating apparatus may use a neural network to detect the bounding box including a region corresponding to the object in the input image. The neural network may be trained to output a bounding box region corresponding to an object (e.g., a vehicle) to be detected from an image. The bounding box may represent a 2D box or a 3D box including the object. The bounding box may have a certain shape (e.g., a rectangle or a rectangular parallelepiped) and may represent a box including the space occupied by the object in the 2D space or the 3D space.

For example, each edge of a 2D bounding box may contact a portion of the object and the 2D bounding box may be a minimum bounding box defined to minimize the size of the 2D bounding box. The top edge of the 2D bounding box may contact the top portion of the object appearing in the input image, and the bottom edge thereof may contact the bottom portion of the object. Each face of a 3D bounding box may contact a portion of the object and the 3D bounding box may be a minimum bounding box defined to minimize the size of the 3D bounding box. When the object is a vehicle, the front portion of the vehicle may contact the front face of the 3D bounding box, and the rear portion of the vehicle may contact the rear face of the 3D bounding box. The upper portion of the vehicle may contact the upper face of the 3D bounding box, and the lower portion of the vehicle may contact the lower face of the 3D bounding box. The side face of the vehicle may contact the side face of the 3D bounding box.

In operation 322, the distance estimating apparatus may track a bounding box. According to an embodiment, the distance estimating apparatus may track an object in an input image acquired in each frame. The distance estimating apparatus may determine a position in the current frame for the bounding box detected in the previous frame. The distance estimating apparatus may store the result of tracking the bounding box in an object information database 340. For example, in response to a case where a real target length (e.g., a real vehicle width) has been estimated for a bounding box corresponding to an object in the previous frame, the distance estimating apparatus may load the real target length of the previous frame from the object information database 340 in the current frame. The distance estimating apparatus may track the object allocated the previous target length acquired in the previous frame. The distance estimating apparatus may determine the current target length for the current frame of the tracked object as the previous target length acquired in the previous frame. Thus, the distance estimating apparatus may stably acquire the real target length corresponding to an object even when it is difficult to estimate the real target length in the current frame. Herein, the frame may represent a time point, and when the current frame is assumed to be a t-th time point, the previous frame may represent any one of 1st to (t−1)th time points. Here, "t" may denote an integer greater than or equal to 2.

The distance estimating apparatus may estimate the previous target length of the object based on an additional sensor in the previous frame. The additional sensor may be another sensor used together with the image sensor and may include, for example, a radar sensor or a LiDAR sensor. The distance estimating apparatus may allocate the estimated previous target length to the object. Thus, when the target length estimation using the additional sensor is unable to be performed in the current frame, the distance estimating apparatus may use the real target length previously acquired in the previous frame.

The object information database 340 may represent a database including information associated with the object. The object information database 340 may include, for example, the identification (ID) of the object, the size of the bounding box, the number of bounding boxes, and the real target length estimated in the previous frame for the object.

The object information database 340 may include object dimension information mapped for each object model (e.g., a vehicle model). The object dimension information may be information related to the dimension of the object corresponding to a certain model and may include, for example, the width, height, and length of the object. The distance estimating apparatus according to an embodiment may determine the object dimension information corresponding to the object based on the visual appearance of the object appearing in the input image. The distance estimating apparatus may acquire the real target length from the object dimension information.

In operation 331, the distance estimating apparatus may extract the distance. For example, the distance estimating apparatus may calculate the distance from the focal length based on the ratio between the real target length and the image target length. The distance calculation will be described below in detail with reference to FIG. 7.

Figure 4:
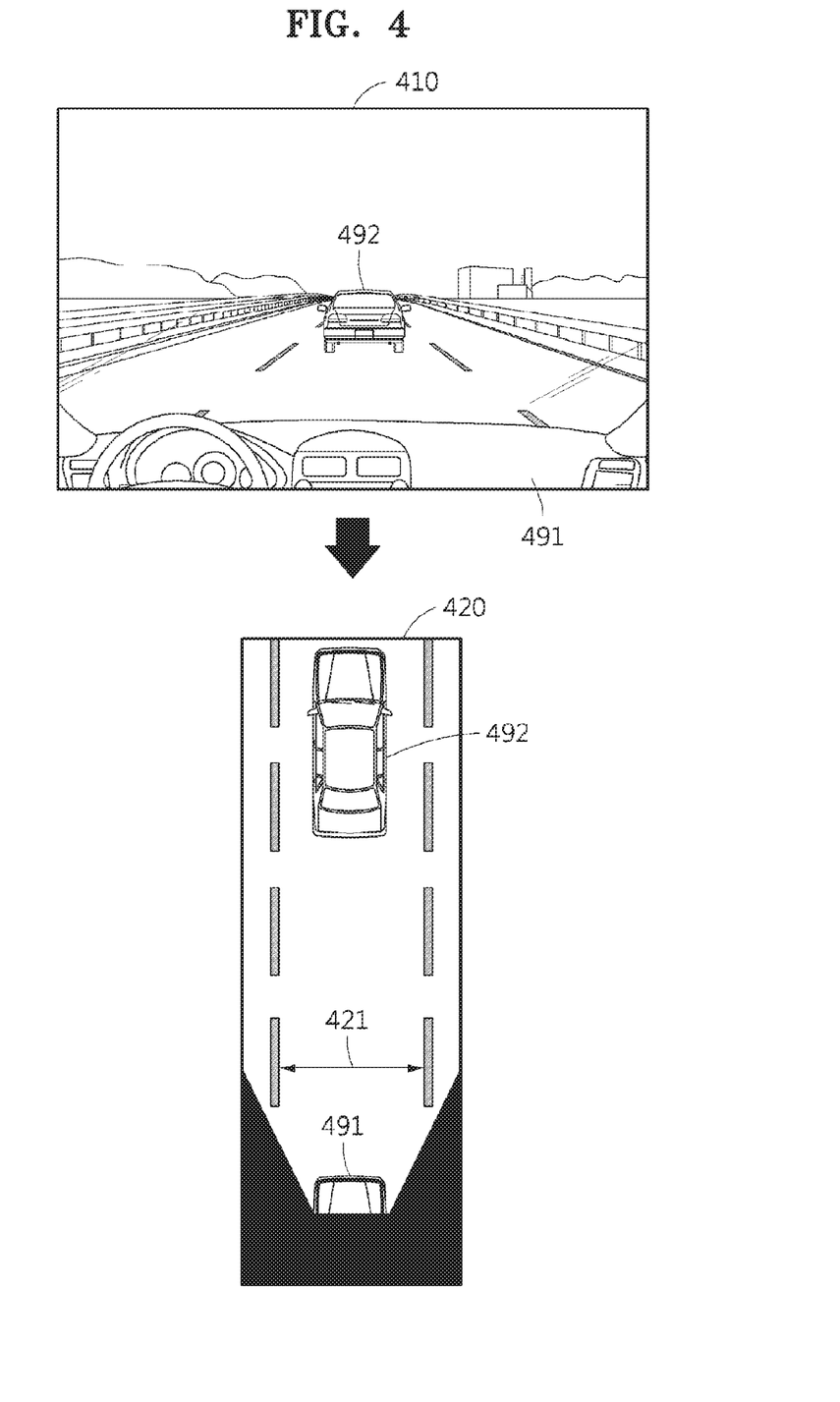
FIG. 4 is a diagram illustrating estimation of a real lane width according to an embodiment.

FIG. 4 is a diagram illustrating estimation of a real lane width according to an embodiment.

A distance estimating apparatus 491 according to an embodiment may estimate a real lane width 421 by using an input image 410 captured on a frontward side thereof. Although the input image 410 illustrated in FIG. 4 includes one vehicle as a preceding object 492 for convenience of description, the number and shape of preceding objects 492 are not limited thereto. The distance estimating apparatus 491 may be mounted on a vehicle, and the input image 410 may include a portion (e.g., a bonnet) of the vehicle. However, the inventive concept is not limited thereto, and a portion of the vehicle may appear in the input image 410 depending on the mounting position and the viewing angle of an image sensor.

The distance estimating apparatus 491 may generate a projection image 420 by projecting the input image 410. For example, the distance estimating apparatus 491 may generate the projection image 420 corresponding to a bird's-eye view. The distance estimating apparatus 491 may convert the input image 410 into the projection image 420 through a matrix operation (e.g., homography matrix calculation) for converting the coordinates of each pixel of the input image 410 into the coordinates on the projection image 420. Since the influence of the movement of the vehicle or the height of the ground surface is small with respect to a region immediately in front of the vehicle, the coordinates of the region closer to the vehicle in the projection image 420 may be more accurate.

The distance estimating apparatus 491 may identify lane lines in the projection image 420. The distance estimating apparatus 491 may calculate the physical coordinates (e.g., 2D coordinates) of positions corresponding to the lane line. The distance estimating apparatus 491 may calculate the horizontal interval between two parallel lane lines by using the physical coordinates of the lane line. The distance estimating apparatus 491 may estimate the real lane width 421 based on the interval between the identified lane lines. The projection image 420 generated through the projection image operation corresponding to the bird's eye view may represent accurate coordinates with respect to the region closer to the sensor. Thus, in order to estimate the lane width more accurately, the distance estimating apparatus 491 may use the information of the region closer to the distance estimating apparatus 491 in the projection image 420.

For example, the distance estimating apparatus 491 may identify the lane lines corresponding to the lane where the object 492 is located in the projection image 420. The distance estimating apparatus 491 may estimate the real lane width 421 based on the horizontal distance between the boundary lines within a threshold distance from the distance estimating apparatus 491 among the identified lane lines. Herein, the real lane width 421 may represent the real width of the lane in the physical world.

The distance estimating apparatus 491 according to an embodiment may assume that the lane width at the position of the object 492 is the same as or similar to the lane width around the distance estimating apparatus 491. Thus, the distance estimating apparatus 491 may estimate the real lane width 421 of the lane around the object 492 based on the projection image 420 around the distance estimating apparatus 491, as described above.

As illustrated in FIG. 4, due to the viewing angle of the image sensor, the lane line of another lane on the projection image 420 may be identified at a position spaced apart from the distance estimating apparatus 491. Thus, the distance estimating apparatus 491 may also estimate the real lane width 421 for the lane of an object located in a different lane than the distance estimating apparatus 491 itself.

In response to a case where a point at which a lane line corresponding to the lane where the object 492 is located is identified in the current frame is closer than a point identified in the previous frame, the distance estimating apparatus 491 may update the real lane width 421 based on the point at which the lane line is identified in the current frame. Thus, since the lane width may be more accurately calculated by using the information of the region closer to the apparatus in the projection image 420, the distance estimating apparatus 491 may more accurately update the real lane width 421.

According to another embodiment, the distance estimating apparatus 491 may estimate the real lane width 421 only when a width change between the lane width at the position of the object 492 and the lane width around the apparatus is not great. For example, the distance estimating apparatus 491 may exclude the estimation of the real lane width 421 in response to a case where a width change of the lane where the object 492 is located exceeds a threshold change. When excluding the estimation of the real lane width 421, the distance estimating apparatus 491 may acquire the real lane width 421 by another method or exclude the estimation of the real target length of the object.

Figure 5:
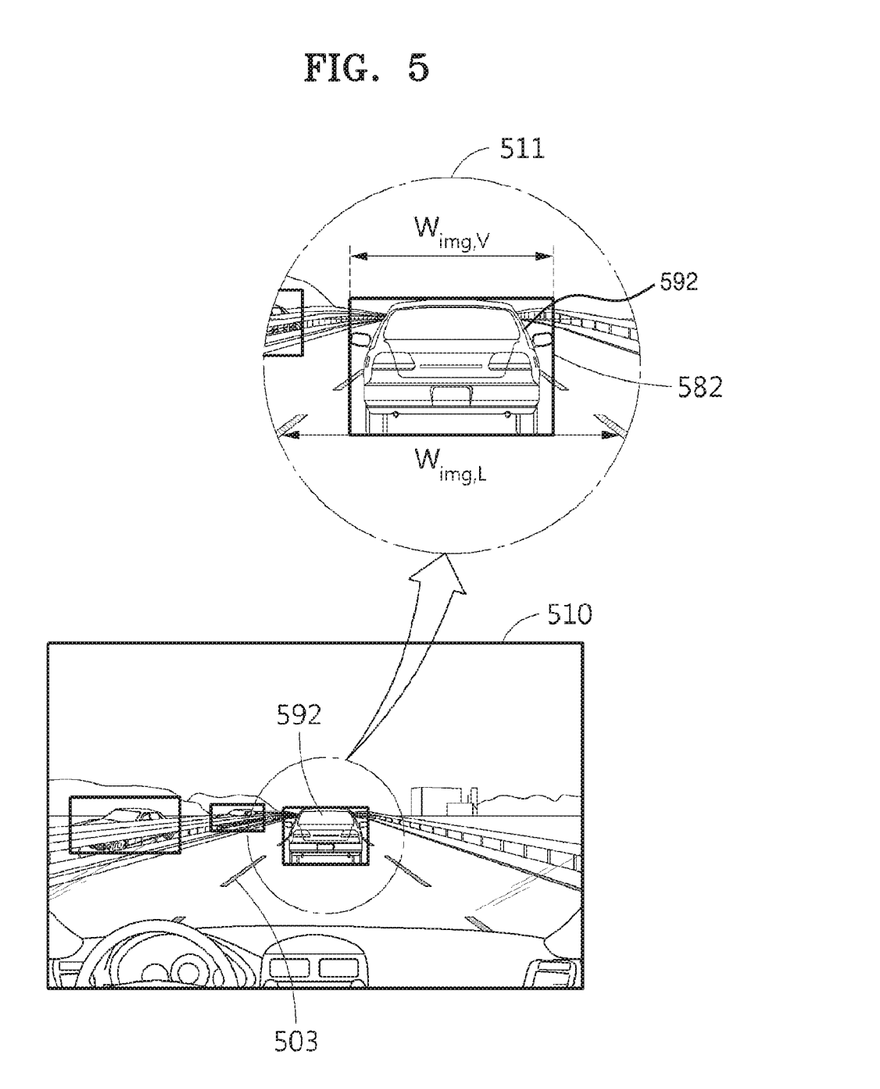
FIGS. 5 and 6 are diagrams illustrating estimation of a vehicle width according to an embodiment.
Figure 6:
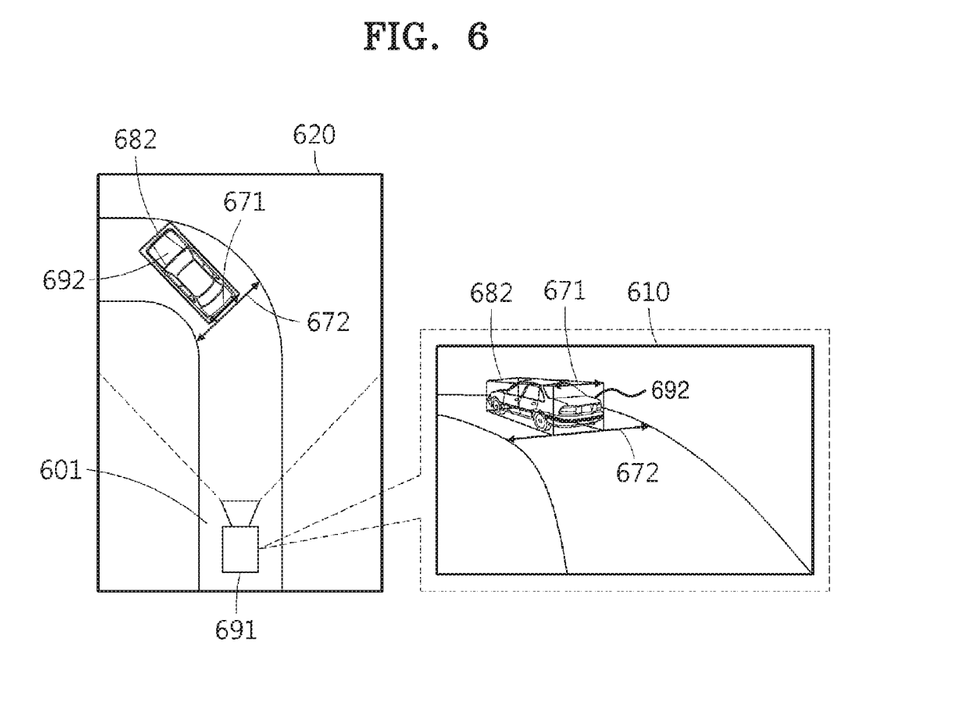

FIGS. 5 and 6 are diagrams illustrating estimation of a vehicle width according to an embodiment.

FIG. 5 is a diagram illustrating a process of estimating a real target length in a state where a vehicle mounted with a distance estimating apparatus is driving in a general road.

The distance estimating apparatus may detect a preceding object 592 on a frontward side thereof from the input image 510. For example, the distance estimating apparatus may detect a bounding box 582 including the preceding object 592. FIG. 5 illustrates an input image 510 in which a bounding box for each of three preceding objects is detected. FIG. 5 illustrates an example in which the bounding box 582 is detected in a 2D form. An enlarged image 511 is an enlarged partial image including the bounding box 582.

The distance estimating apparatus may determine the image target length and the interval between lane lines 503 from the input image 510.

For example, the distance estimating apparatus may determine the image target length from the bounding box 582 detected from the input image 510. The distance estimating apparatus may determine the pixel distance corresponding to the width of the object as the image target length. The pixel distance corresponding to the width of the object may correspond to the width of the bounding box 582. The distance estimating apparatus may determine the length of the base line or the upper edge in the bounding box 582 as the pixel distance corresponding to the width of the object.

The distance estimating apparatus may determine the image lane width based on the bounding box 582 detected from the input image 510. The distance estimating apparatus may determine the image lane width based on the intersection point between the lane line 503 and the extension line of the base line of the bounding box 582. When the preceding object 592 is a vehicle, it is assumed that the vehicle maintaining a driving lane generally drives in parallel to the lane line 503 along the center axis of the lane. In this case, the longitudinal axis of the preceding vehicle may be parallel to the lane line 503, and the lateral axis of the preceding vehicle may be perpendicular to the lane line 503. Thus, since the base line of the bounding box 582 is parallel to the lateral axis of the preceding vehicle, the length between the intersection points between the lane line 503 and the extension line of the base line may correspond to the image lane width. The distance estimating apparatus may determine the pixel distance between the intersection points between the lane line 503 and the extension line of the base line as the image lane width.

Subsequently, the distance estimating apparatus may estimate the real target length based on the image target length and the image lane width calculated as described above. For example, the distance estimating apparatus may calculate the ratio between the image target length and the image lane width corresponding to the lane where the object 592 is located from the input image 510. The distance estimating apparatus may calculate the ratio between the pixel distance corresponding to the interval between the lane lines 503 in the input image 510 and the pixel distance corresponding to the width of the object 592. The distance estimating apparatus may estimate the real target length from the real lane width based on the above ratio according to Equations 1 and 2 below.

$$\text{Ratio}_{img} = (W_{img,V}/W_{img,L}) \qquad \text{Equation 1}$$

$$W_{real,V} = \text{Ratio}_{img} \cdot W_{real,L} \qquad \text{Equation 2}$$

In Equation 1, $W_{img,V}$ may denote the image target length (e.g., the width of the vehicle appearing in the image) in pixels, and $W_{img,L}$ may denote the image lane width in pixels. $\text{Ratio}_{img}$ may denote the ratio between the image target length $W_{img,V}$ and the image lane width $W_{img,L}$. In Equation 2, $W_{real,L}$ may denote the real lane width. For example, the distance estimating apparatus may acquire the real lane width $W_{real,L}$ through the operation described above with reference to FIG. 4. $W_{real,V}$ may denote the real target length (e.g., the real width of the vehicle).

For example, when the image target length $W_{img,V}$ is a distance corresponding to 15 pixels and the image lane width $W_{img,L}$ is a distance corresponding to 20 pixels, the ratio $\text{Ratio}_{img}$ may be 0.75. When the real lane width $W_{real,L}$ calculated through homography in FIG. 4 is 4 m, the real target length $W_{real,V}$ may be 3 m.

In the case where the real target length $W_{real,V}$ has been estimated for an object 592 at a close distance from the apparatus, the distance estimating apparatus may maintain the previously-estimated real target length $W_{real,V}$ while continuing to track the object 592 when the object 592 moves away from the apparatus. This is because the value estimated at a close distance may be more accurate than the value estimated at a long distance. By maintaining the previously-estimated real target length $W_{real,V}$, the distance estimating apparatus may robustly estimate the distance to the object 592 even when the object 592 moves away therefrom and thus the lane line 503 around the object 592 is not identified or the lane width around the object 592 is not constant. In addition, the distance estimating apparatus may update the real target length $W_{real,V}$ for the object 592 in response to a case where the distance from the object 592 is less than the distance at which the real target length $W_{real,V}$ is previously estimated. This is because the real target length $W_{real,V}$ may be more accurately estimated when the object 592 is located at a closer position.

Although FIG. 5 has been described with reference to a straight road, the inventive concept is not limited thereto. Even when driving on a curved road, the distance estimating apparatus may detect a 2D bounding box and estimate a real target length as described with reference to FIG. 5.

FIG. 6 is a diagram illustrating a process of estimating a real target length in a state where a vehicle mounted with a distance estimating apparatus is driving on a curved road.

A top-view image 620 illustrates a state in which a vehicle mounted with a distance estimating apparatus 691 is driving on a curved road 601. Although only one lane of the curved road 601 is illustrated in the top-view image 620, this is merely for convenience of description and the inventive concept is not limited thereto. An input image 610 may include a preceding object 692 appearing distorted when the preceding object 692 drives at a curved portion of the curved road 601. Thus, the distance estimating apparatus 691 may estimate the real target length of an object more accurately by considering the pose of the object 692.

The distance estimating apparatus 691 according to an embodiment may estimate the pose of the object 692 from the input image 610. The distance estimating apparatus 691 may determine an image target length 671 based on the estimated pose. For example, the distance estimating apparatus 691 may detect a 3D bounding box 682 corresponding to the object 692 from the input image 610. The distance estimating apparatus 691 may determine the image target length 671 based on the 3D bounding box 682. The distance estimating apparatus 691 may determine the width of the 3D bounding box 682 (e.g., the length of the upper line or the base line on the rear face of the box) as the image target length 671.

The distance estimating apparatus 691 may determine an image lane width 672 based on the pose of the object 692 in the input image 610. For example, the distance estimating apparatus 691 may determine the image lane width 672 based on the intersection point between the lane line and the extension line of the base line of the rear face constituting the 3D bounding box 682.

The distance estimating apparatus 691 may estimate the real target length according to Equations 1 and 2 based on the image target length 671 and the image lane width 672 determined according to the description with reference to FIG. 6.

Although FIG. 6 has been described with reference to the curved road 601, the inventive concept is not limited thereto. Even when driving on a straight road 601, the distance estimating apparatus 691 may detect a 3D bounding box 682 and estimate a real target length as described with reference to FIG. 6.

In addition, the distance estimating apparatus may identify the linearity of a driving road and determine a distance estimating method according to the identified linearity. For example, in response to a case where the current driving road is identified as a straight road (e.g., a road having a curvature of less than a threshold curvature), the distance estimating apparatus may detect a 2D bounding box from an input image and estimate a real target length as described above with reference to FIG. 5. As another example, in response to a case where the current driving road is identified as a curved road (e.g., a road having a curvature equal to or exceeding a threshold curvature), the distance estimating apparatus may detect a 3D bounding box or the pose of an object from an input image and estimate a real target length as described with reference to FIG. 6. However, this is merely an example, and the operation of the distance estimating apparatus is not limited thereto.

Figure 7:
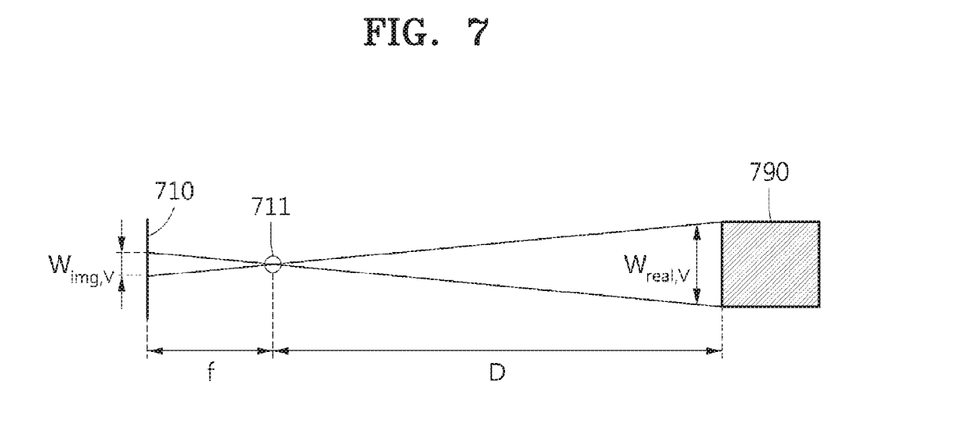
FIG. 7 is a top view illustrating distance estimation according to an embodiment.

FIG. 7 is a top view illustrating distance estimation according to an embodiment.

FIG. 7 is a top view illustrating an object 790, a focal point 711, and an image plane 710 of an image sensor of a distance estimating apparatus. The image plane 710 may be a plane corresponding to the points at which the light passed through a lens is received in the image sensor, and each point of the image plane 710 may correspond to each pixel of the input image. The light reflected and received from the object 790 outside the distance estimating apparatus may pass the focal point 711 of the lens and reach the image plane 710. The positional relationship between a focal length f and a distance D may be the same as the positional relationship between an image target length $W_{img,V}$ and a real target length $W_{real,V}$ appearing on the image plane 710.

$$D = f \cdot \frac{W_{real,V}}{W_{img,V}} \qquad \text{Equation 3}$$

Thus, the distance estimating apparatus may calculate the distance D from the focal length f based on the ratio between the real target length $W_{real,V}$ and the image target length $W_{img,V}$ according to Equation 3. The distance D may represent the distance from the focal point 711 of the lens to the object 790 in the image sensor.

Figure 8:
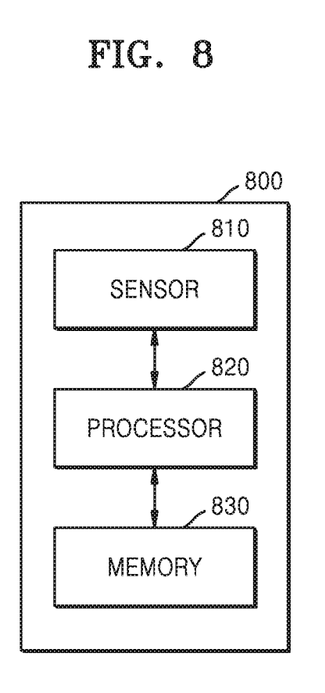
FIG. 8 is a block diagram illustrating a configuration of a distance estimating apparatus according to an embodiment.

FIG. 8 is a block diagram illustrating a configuration of a distance estimating apparatus according to an embodiment.

A distance estimating apparatus 800 according to an embodiment may include a sensor 810, a processor 820, and a memory 830.

The sensor 810 may be an image sensor 810 for acquiring an input image on a frontward side thereof. The image sensor 810 may generate a color image, and the color image may include a plurality of color channel images. However, the inventive concept is not limited thereto, and the image sensor 810 may generate a single color image (e.g., a black-and-white image).

The processor 820 may acquire a real target length corresponding to target points of an object. The processor 820 may calculate an image target length corresponding to the real target length from the input image. The processor 820 may estimate the distance from the distance estimating apparatus 800 to the object based on the real target length of the object, the image target length, and the focal length thereof. However, the operation of the processor 820 is not limited thereto, and the processor 820 may perform the operations described with reference to FIGS. 1 to 7.

The memory 830 may temporarily or permanently store data used to perform the distance estimating method. For example, the memory 830 may store the real target length estimated in the previous frame, the real lane width, the distance from the object in the previous frame, and the like.

The apparatuses described above may be implemented as hardware components, software components, and/or a combination of hardware components and software components. For example, the apparatuses and components described in the embodiments may be implemented by using one or more general-purpose computers or special-purpose computers such as processors, controllers, arithmetic logic units (ALUs), digital signal processors, microcomputers, field programmable arrays (FPAs), programmable logic units (PLUs), microprocessors, or any other apparatuses capable of executing and responding to instructions. The processor may execute an operating system (OS) and one or more software applications that are executed on the OS. Also, the processor may access, store, operate, process, and generate data in response to execution of the software. For convenience of understanding, the processor may be described as being used singly; however, those of ordinary skill in the art will understand that the processor may include a plurality of processing elements and/or a plurality of types of processing elements. For example, the processor may include a plurality of processors or one processor and one controller. Also, other processing configurations such as parallel processors may also be possible.

The software may include computer programs, code, instructions, or a combination of one or more thereof and may configure the processor to operate as desired or may command the processor independently or collectively. In order to be interpreted by the processor or to provide commands or data to the processor, software and/or data may be permanently or temporarily embodied in any type of machine, component, physical apparatus, virtual equipment, computer storage medium or apparatus, or transmitted signal wave. The software may be distributed over a network-coupled computer system to be stored or executed in a distributed manner. The software and data may be stored on one or more computer-readable recording mediums.

The method according to an embodiment may be embodied in the form of program commands executable through various computer means, which may be recorded on a computer-readable recording medium. The computer-readable recording medium may include program commands, data files, and data structures either alone or in combination. The program commands recorded on the computer-readable recording medium may be those that are especially designed and configured for the embodiment, or may be those that are known and available to computer programmers skilled in the art. Examples of the computer-readable recording mediums may include magnetic recording mediums such as hard disks, floppy disks, and magnetic tapes, optical recording mediums such as compact disk read-only memories (CD-ROMs) and digital versatile disks (DVDs), magneto-optical recording mediums such as floptical disks, and hardware devices such as ROMs, RAMs, and flash memories that are especially configured to store and execute program commands. Examples of the program commands may include machine language code that may be generated by a compiler, and high-level language code that may be executed by a computer by using an interpreter. The hardware device may be configured to operate as one or more software modules in order to perform the operation of the embodiment, and vice versa.

While the embodiments have been described with reference to the drawings, those of ordinary skill in the art may make various changes and modifications therein without departing from the spirit and scope of the inventive concept. For example, the described techniques may be performed in a different order than the described method, and/or the described components such as systems, structures, devices, and circuits may be united or combined in a different form than the described method or may be replaced or substituted by other components or equivalents thereof.

Therefore, other implementations, other embodiments, and equivalents of the following claims are within the scope of the following claims.

While the inventive concept has been particularly shown and described with reference to embodiments thereof, it will be understood that various changes in form and details may be made therein without departing from the spirit and scope of the following claims.

What is claimed is:

1. A distance estimating method comprising:
acquiring a real target length corresponding to target points of an object;
calculating, from an input image, an image target length corresponding to the real target length; and
estimating a distance from a distance estimating apparatus to the object, based on the real target length, the image target length, and a focal length thereof,
wherein the acquiring of the real target length includes calculating the real target length based on the image target length and a lane line appearing in the input image,
wherein the calculating the image target length includes:
detecting, from the input image, a bounding box corresponding to the object; and
determining the image target length from the bounding box,
wherein the calculating the real target length includes:
calculating, from the input image, a ratio between the image target length and an image lane width corresponding to a lane where the object is located; and
estimating the real target length from a real lane width based on the ratio, wherein the calculating the ratio includes:
estimating the lane line for the lane where the object is located in the input image; and
determining the image lane width based on an intersection point between the lane line that is estimated and an extension line that extends from a base line of the bounding box toward the lane line,
wherein the estimating the real target length includes estimating the real lane width based on a projection image obtained by projecting the input image on a ground surface, and
wherein the estimating the real target length includes updating, in response to a case where a first point at which the lane line corresponding to the lane where the object is located is identified in a current frame is closer than a second point identified in a previous frame, the real lane width based on the first point.

2. The distance estimating method of claim 1, wherein the estimating the lane line includes detecting the lane line by interpolating portions corresponding to a same line in the input image.

3. The distance estimating method of claim 1, wherein the calculating the image target length includes:
estimating a pose of the object from the input image; and
determining the image target length based on the pose, and
wherein the image lane width is determined based on the pose of the object in the input image.

4. The distance estimating method of claim 1, wherein the bounding box is a three-dimensional (3D) bounding box corresponding to the object; and
the image target length is determined based on the 3D bounding box, and
wherein the base line is of a rear face constituting the 3D bounding box.

5. The distance estimating method of claim 1, wherein the estimating the real lane width includes:
identifying lane lines corresponding to the lane where the object is located in the projection image; and
estimating the real lane width based on a horizontal interval between boundary lines within a threshold distance from the distance estimating apparatus among the lane lines that are identified.

6. The distance estimating method of claim 1, wherein the estimating the real target length includes acquiring, from map data corresponding to a current road, the real lane width of the lane where the object is located.

7. The distance estimating method of claim 1, wherein the calculating the ratio includes calculating a pixel ratio between a first pixel distance corresponding to an interval between lane lines in the input image and a second pixel distance corresponding to a width of the object.

8. The distance estimating method of claim 1, wherein the calculating the ratio includes excluding the real target length of the object that is estimated in response to a case where a width change of the lane where the object is located exceeds a threshold change.

9. The distance estimating method of claim 1, wherein the acquiring of the real target length includes:
tracking the object allocated a previous target length acquired in the previous frame; and
determining a current target length of the object that is tracked in the current frame as the previous target length acquired in the previous frame.

10. The distance estimating method of claim 9, wherein the tracking the object includes:
estimating the previous target length of the object based on an additional sensor in the previous frame; and
allocating the previous target length that is estimated to the object.

11. The distance estimating method of claim 1, wherein the acquiring the real target length includes:
determining object dimension information corresponding to the object based on a visual appearance of the object represented in the input image; and
acquiring the real target length from the object dimension information.

12. The distance estimating method of claim 1, wherein the estimating the distance includes calculating the distance from the focal length based on a ratio between the real target length and the image target length.

13. A non-transitory computer-readable recording medium having recorded thereon at least one computer program comprising at least one instruction for performing the distance estimating method of claim 1.

14. A distance estimating apparatus comprising:
an image sensor configured to acquire an input image; and
a processor configured to:
acquire a real target length corresponding to target points of an object;
calculate, from the input image, an image target length corresponding to the real target length; and
estimate a distance from the distance estimating apparatus to the object, based on the real target length, the image target length, and a focal length thereof,
wherein the acquiring of the real target length includes calculating the real target length based on the image target length and a lane line appearing in the input image,
wherein the calculating the image target length includes:
detecting, from the input image, a bounding box corresponding to the object; and
determining the image target length from the bounding box,
wherein the calculating the real target length includes:
calculating, from the input image, a ratio between the image target length and an image lane width corresponding to a lane where the object is located; and
estimating the real target length from a real lane width based on the ratio,
wherein the calculating the ratio includes:
estimating the lane line for the lane where the object is located in the input image; and
determining the image lane width based on an intersection point between the lane line that is estimated and an extension line that extends from a base line of the bounding box toward the lane line,
wherein the estimating the real target length includes estimating the real lane width based on a projection image obtained by projecting the input image on a ground surface, and
wherein the estimating the real target length includes updating, in response to a case where a first point at which the lane line corresponding to the lane where the object is located is identified in a current frame is closer than a second point identified in a previous frame, the real lane width based on the first point.

* * * * *